United States Patent [19]

Gürs et al.

[11] Patent Number: 4,672,622
[45] Date of Patent: Jun. 9, 1987

[54] GAS TRANSPORT LASER APPARATUS WITH AXIAL GAS FLOW

[75] Inventors: Karl Gürs, Eschborn; Rasmus Beck, Neu Isenburg, both of Fed. Rep. of Germany

[73] Assignee: 501 Battelle-Institute e.V., Fed. Rep. of Germany

[21] Appl. No.: 673,336

[22] Filed: Nov. 20, 1984

[30] Foreign Application Priority Data

Dec. 10, 1983 [DE] Fed. Rep. of Germany ....... 3344714

[51] Int. Cl.$^4$ .......................... H01S 3/22; H01S 3/223
[52] U.S. Cl. .......................................... 372/58; 372/35
[58] Field of Search .............................. 372/35, 58, 90

[56] References Cited

U.S. PATENT DOCUMENTS 4,064,465 12/1977 Hundstad et al. .................... 372/58

FOREIGN PATENT DOCUMENTS 125883 10/1981 Japan .................................. 372/58
2129203 5/1984 United Kingdom ................. 372/58

OTHER PUBLICATIONS

Olsen et al.; "Closed Cycle Annular-Flow-Return Laser; Rev. Sci Instrum.; vol. 52, No. 7; Jul. 1981; pp. 984–988.

Primary Examiner—William L. Sikes
Assistant Examiner—Robert E. Wise
Attorney, Agent, or Firm—Birch, Stewart, Kolasch & Birch

[57] ABSTRACT

In a gas transport laser with axial gas flow, a radial blower is provided for the gas circulation on the axis of which a laser resonator has been arranged. The laser resonator is concentrically enclosed by a ring channel serving as a cooling section. For this purpose, several heat exchangers are provided in the ring channel which are connected to a water reservoir. The water reservoir preferably serves as the cover plate of the radial turbine, and carries—at the same time—the cathode being shaped as a ring electrode.

9 Claims, 3 Drawing Figures

GAS TRANSPORT LASER APPARATUS WITH AXIAL GAS FLOW

The invention refers to a gas transport laser apparatus with axial gas flow and a discharge tube centrally arranged within a housing.

The degree of efficiency of a CO laser decreases with increasing temperatures. In order to keep the temperature as low as possible, the heated laser gas mixture is removed from the laser area by a recirculating device, and is replaced by a cooled laser gas mixture (App. Phys. Lett. 15, 1969, 91). An efficient blower, such as a ventilator or a Root's blower, is used for a fast circulation of the active laser gas mixture. However, for convection lasers of this type, a sufficiently high flow rate can only be maintained with a relatively high pressure drop along the laser pipe. Therefore, the discharge conditions along the pipe are not uniform. A high power blower is necessary which has an unfavourable influence on the volume and the weight of the entire device.

In a known convection laser arrangement, the gas mixture in the discharge pipe is circulated on a helical path via appropriately formed watercooled guide vanes(DE-OS No. 29 16 408). The mixture resides in the active zone of the laser for a short period only, and has enough time during circulation to dissipate the generated heat. Each of the helical guide vanes has a hole which is arranged on one common axis.

Through these holes, the gas discharge takes place for the excitation of the laser gas mixture. This device has the advantage that only a relatively low circulation rate is required and that a good mode quality is achieved due to the longitudinal arrangement of the laser resonator. However, it seems to be difficult to keep the gas discharge at the same location since it is easily blown out of the resonator by the gas flow. Favourable operating conditions may only be maintained at certain discharge parameters so that it is difficult to control the intensity of this laser type.

These disadvantages of known convection lasers can be prevented with a device in which the laser chamber is formed as a cooled tube and is arranged concentrically within a circulation turbine (DE-OS No. 31 21 372). In this way, a considerable progress compared with usual gas transport lasers with longitudinal gas flow is achieved. It is true, however, that this laser can only be realized with a great technical effort. Due to the large diameter in the event of an outer bearing, and the high rate of revolution of moving parts against fixed parts, the production of the bearings is especially expensive. The circulation compressor represents a special construction. The production of a rotor with turbine blades mounted on a rotating outer cylinder is also difficult.

The object of the present application is, therefore, to develop a convection laser for the generation of high efficiency laser radiation where the temperature increase in the laser gas can effectively be suppressed, avoiding at the same time the constructional disadvantages of known devices.

According to the invention, a radial blower is provided for gas circulation on the axis of which a laser resonator has been arranged and the laser resonator is surrounded by a ring channel which serves as a cooling section for the laser gas.

Heat exchanger pipes are arranged within the ring channel parallel to the axis of the laser resonator. The heat exchanger pipes are connected to a water reservoir which has been designed rotation-symmetrically in the form of a circular ring. This circular ring should preferably have a wedge-shaped cross section. In accordance with a special variation of the invention, the circular ring surrounds the laser resonator concentrically and is provided with a ring-shaped electrode close to the discharge pipe. The circular ring is preferably mounted adjacent to the radial blower, and is designed to serve as the cover plate of the radial blower. At the end of the discharge pipe opposite to the radial blower, slotted jets have been provided, through which the cooled laser gas may flow into the discharge pipe. In this area, a distributed anode is mounted as well, i.e. preferably in the form of several pin electrodes. The drive for the radial turbine is equipped with a gas bearing, operating with laser gas. According to a preferred embodiment, two or more laser devices of this type may be mounted on one optical axis, in a way that two radial blowers driven by one motor.

For this purpose, the radial blower must have a central opening for the passing of the laser radiation field.

Further details, characteristics and advantages of the invention are described in the following and in the claims and are evident from the schematic drawings:

Figure 1:
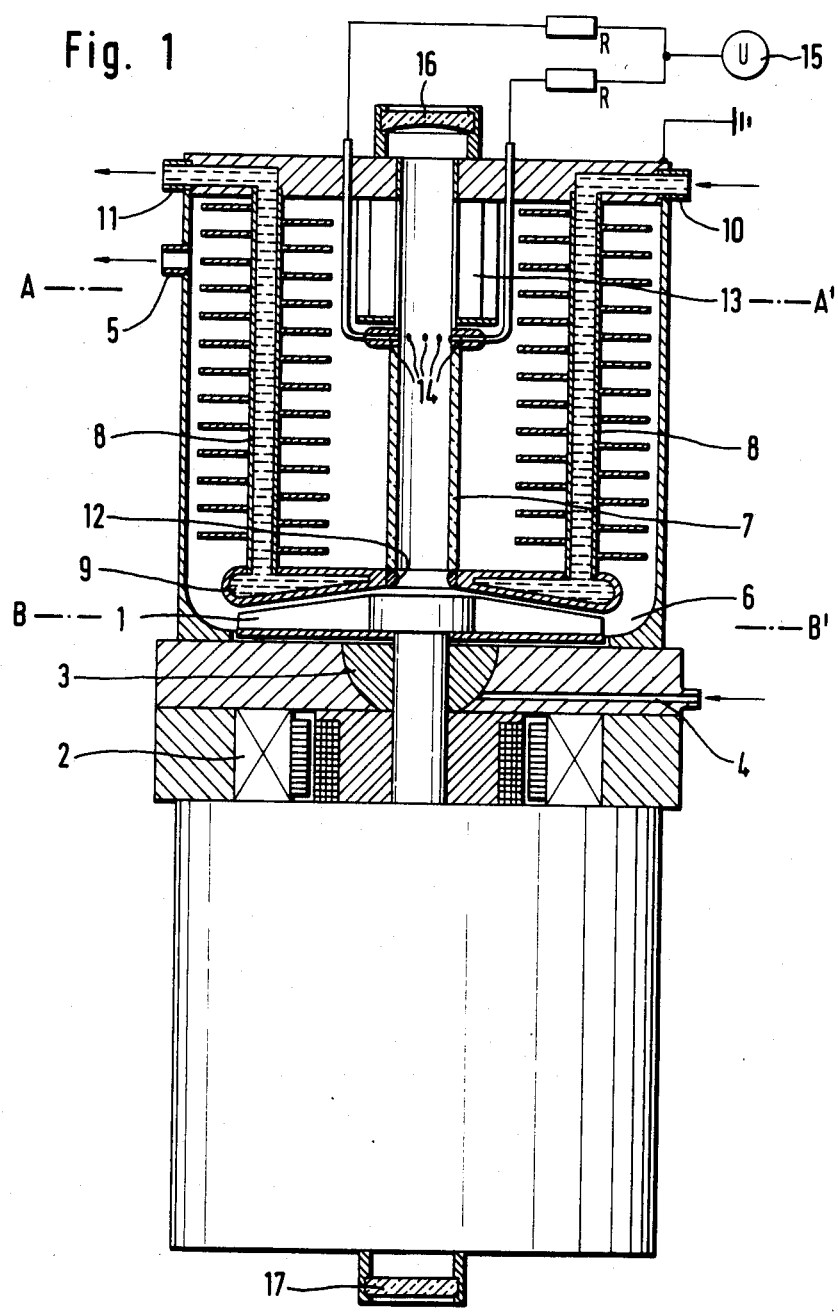
FIG. 1 shows, in a longitudinal section, a dual module formed by the coupling of two laser arrangements according to the invention.

In the laser apparatus shown in FIG. 1, a radial blower 1 is used for the recirculation of the laser gas. Both devices which form a dual module, are coupled with each other laterally at the radial blowers 1. The radial blowers 1 are driven by a motor 2 which may be a high-frequency three-phase motor or a DC motor with electronic commutation.

The drive for the radial blowers 1 is provided with a gas bearing 3 (e.g. a spherical bearing in accordances with G. J. Watt). The operating gas for the bearing 3 may preferably be the laser gas mixture. The gas mixture is pressed into the spherical bearing by e.g. approx. 7 bar through an inlet port 4. The laser gas expands when leaving the bearing into the laser chamber. The operating pressure of the laser of approx. 100 mbar is maintained by a vacuum pump—which is not shown here—which is connected to the gas outlet port 5.

The rate of revolutions of the blower 1 is preferably within a range of more than 15000 revolutions/min. In this way, the necessary flow rates in the laser pipe of 150 m/s or more may be reached, at a turbine diameter of approx. 150 mm.

Figure 2:
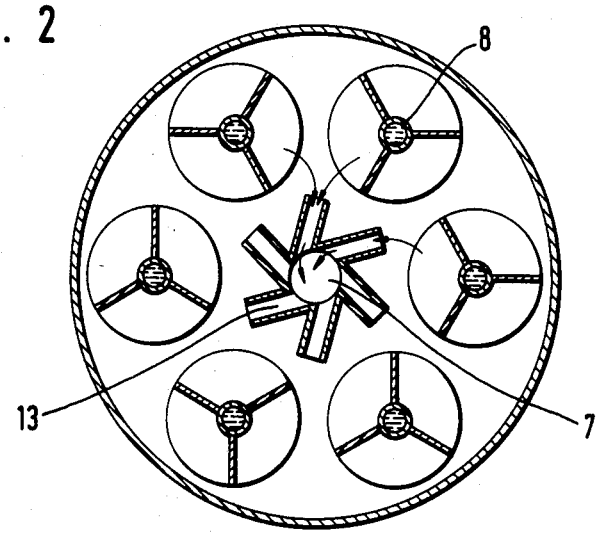
FIG. 2 shows the A-A'-section.
Figure 3:
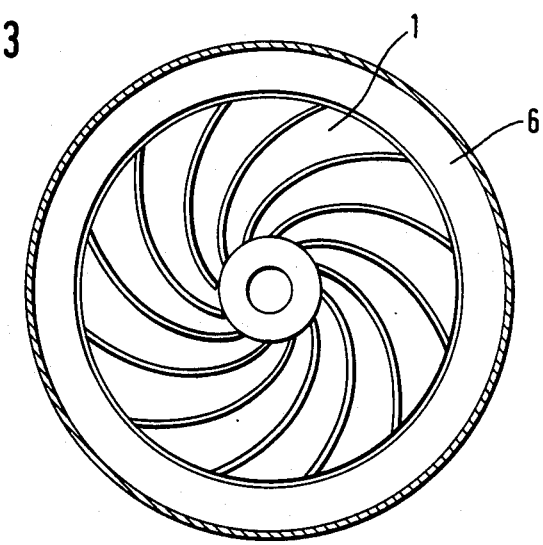
FIG. 3 shows the B-B'-section of the arrangement shown in FIG. 1.

The radial blower 1 operates within a ring channel 6 which is arranged concentrically to the laser resonator and is designed to serve as a cooling section. According to the invention several heat exchanger pipes are provided for this purpose. A preferred embodiment of the heat exchanger pipes 8 with cooling ribs is shown in FIG. 2 in which the A-A'-section in FIG. 1 is shown with dotted lines. In this embodiment, six heat exchanger pipes 8 are placed within the circular channel 6. The pipes 8 are parallel to the axis of the laser resonator 7. Other variations of the heat exchanger are possible as well. In a suitable arrangement, a larger or smaller number of heat exchanger pipes may be provided in the ring channel 6 as well.

According to an especially preferred embodiment, the heat exchanger pipes 8 are connected to a water reservoir 9 and form—together with the water intake port 10 and the water outlet port 11—the cooling system.

The water reservoir 9 is designed as a circular ring, has preferably a wedge-shaped cross section and encloses the laser resonator 7 like a sleeve. In this arrangement it is designed to serve as the cover plate for the radial blower 1 as well.

The cathode 12 is preferably mounted to the circular water reservoir 9, and is formed as a ring electrode. Thereby, it is well cooled and, at the same time, grounded to the housing.

The ring channel 6 in which the blower 1 is running, deflects the gas flow and passes it across the heat exchanger 8. The cooled laser gas then flows into the laser tube 7 through an arrangement of several slotted jets 13. The slotted jets 13 are preferably arranged in a manner so that a rotational flow is created in the laser tube. An arrangement of this type, where the slotted jets tangentially lead to the laser tube, is shown in FIG. 2.

In order to achieve a uniform discharge, the anode of the discharge system is splitted. Six or more pin anodes 14 are preferably used which are connected to the power source 15 via separate preresistances.

In the dual module shown in FIG. 1, the laser tube 7 is leading through holes in the appropriate blowers 1 and is closed with laser mirrors 16 and 17. It is also possible to mount several of these dual modules along an optical axis in series in order to obtain a higher output. In this event, the modules are coupled—as mentioned above—, and the end flanges are provided with laser mirrors.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A laser apparatus with an axial laser gas flow comprising:
   a housing;
   a gas discharge pipe centrally disposed within said housing;
   radial-flow blower means for providing gas circulation within the gas discharge pipe, said gas discharge pipe being axially disposed with respect to said radial-flow blower means; and
   a ring channel concentrically enclosing said discharge pipe, said ring channel serving as a cooling section for the laser gas.

2. The laser apparatus as claimed in claim 1, further comprising at least two heat exchanger pipes wherein said heat exchanger pipes are mounted parallel to the axis of said discharge tube in the ring channel and are connected to a circular ring with a substantially wedge-shaped section serving as a water reservoir.

3. Laser apparatus as claimed in claim 2, wherein said circular ring encloses the discharge tube, and is provided with a ring-shaped cathode close to the discharge tube.

4. Laser apparatus as claimed in claim 2, wherein said circular ring is disposed above said radial-flow blower means, being a cover plate for the radial-flow blower means.

5. Laser apparatus as claimed in claim 1, wherein slotted jets are provided at the end of the discharge tube opposite to the radial-flow blower means, such that the laser has can flow into the discharge tube through said slotted jets.

6. The laser apparatus as claimed in claim 1 wherein an anode consisting of a plurality of pin electrodes is disposed at the peripheral area of the discharge tube, said plurality of pin electrodes being connected to a power source via separate predetermined resistances.

7. The laser apparatus as claimed in claim 1, wherein the radial-flow blower means is provided with a drive equipped with a gas bearing which is fed by the laser gas.

8. The laser apparatus of claim 1, wherein the radial-flow blower means is provided with at least two blades having one motor shaft, the radial-flow blower means and the motor shaft being provided with a central boring through which two discharge tubes are connected.

9. The laser apparatus of claim 1, wherein a laser resonator is disposed axially through the apparatus, said laser resonator comprising opposing laser mirrors arranged axially outside of the gas guiding housing.

* * * * *